United States Patent [19]
Goepfert

[11] Patent Number: 5,890,569
[45] Date of Patent: Apr. 6, 1999

[54] VIBRATION ISOLATION SYSTEM FOR AN INERTIAL SENSOR ASSEMBLY

[75] Inventor: Scott J. Goepfert, Ramsey, Minn.

[73] Assignee: Honeywell Inc., Minneapolis, Minn.

[21] Appl. No.: 869,605

[22] Filed: Jun. 6, 1997

[51] Int. Cl.⁶ .................................................. F16F 7/10
[52] U.S. Cl. ..................... 188/378; 267/136; 267/141.2
[58] Field of Search ................... 188/378, 379, 188/380; 267/136, 140.11–141.7; 248/562, 636, 638; 74/574; 244/118.1, 3.16; 73/510, 431, 504.18

[56] References Cited

U.S. PATENT DOCUMENTS

| | | | |
|---|---|---|---|
| 3,843,108 | 10/1974 | Krupick et al. | 267/137 |
| 4,114,246 | 9/1978 | Kamman | 29/451 |
| 4,603,997 | 8/1986 | Hundt et al. | 403/228 |
| 4,700,934 | 10/1987 | Andra et al. | 267/140.1 |
| 5,131,619 | 7/1992 | Daugherty et al. | 248/635 |
| 5,231,893 | 8/1993 | Sisco et al. | 74/574 |
| 5,299,468 | 4/1994 | Withers | 74/574 |
| 5,360,236 | 11/1994 | Brown | 248/672 |
| 5,363,700 | 11/1994 | Joly et al. | 73/504 |
| 5,368,271 | 11/1994 | Kiunke et al. | 248/638 |
| 5,425,287 | 6/1995 | Beattie | 74/574 |
| 5,465,924 | 11/1995 | Schneider | 244/118.1 |
| 5,474,499 | 12/1995 | Olson | 464/83 |

FOREIGN PATENT DOCUMENTS

| | | |
|---|---|---|
| 0559402 | 9/1993 | European Pat. Off. . |
| 2271422 | 4/1994 | United Kingdom . |

*Primary Examiner*—Douglas C. Butler
*Attorney, Agent, or Firm*—Albert K. Kau

[57] ABSTRACT

Disclosed is a vibration isolator system for mounting an inertial sensor assembly (ISA) to a support that is subject to shock and vibration. The vibration isolator system includes a ring shaped elastomeric member, and ring shaped outer and inner members. Both the outer and inner members are fixed to the elastomeric member. In addition, the outer member is secured to the support and the inner member is secured to the ISA. The elastomeric member isolates the ISA from shock and vibration that may otherwise be transmitted from the support to the ISA.

17 Claims, 5 Drawing Sheets

VIBRATION ISOLATION SYSTEM FOR AN INERTIAL SENSOR ASSEMBLY

The Government has rights in this invention pursuant to Contract No. F08626-94-C-0003, awarded by the Department of the Air Force.

BACKGROUND OF THE INVENTION

This invention relates to vibration isolator systems for limiting the transmission of externally generated vibrational and shock energy to mechanically sensitive components. In particular, the present invention is a vibration isolator system for mounting a housing for an inertial instrument assembly to a support that is subject to shock and vibration. The vibration isolator system uses a single, integral elastomeric member to absorb and dampen shock and vibrational energy.

In certain environments, it is necessary to isolate mechanically sensitive sensor assemblies from shock and vibrational energy. In many applications, this is accomplished by placing the sensor assembly and other necessary elements within some type of container or housing. Resilient, shock and vibration absorbing mounts are frequently used to limit transmission of externally generated vibrational and shock energy into the housing containing the sensor assembly.

The need to isolate a sensor assembly from shock and vibration is particularly acute when the sensor assembly is an inertial sensor assembly (ISA), which is also known as an inertial measurement unit (IMU). An ISA typically includes inertial sensors such as accelerometers and ring laser gyroscopes. Usually there are three accelerometers and three gyroscopes arranged with their input axes in a particular relationship. The sensors are generally rigidly and precisely mounted to a sensor base which, in turn, is precisely mounted within a housing along with related electronics and hardware. Commonly, the housing is in turn mounted to a support or chassis through suspension mounts or vibration isolators. In turn, the chassis is rigidly and precisely mounted to a frame of a vehicle, such as an aircraft.

In operation, the sensors provide inertial data, such as linear and angular acceleration information to a navigational computer onboard the aircraft. The navigational computer processes the data for flight control and/or navigation of the aircraft. For optimum performance, the sensors of the ISA need to provide precise inertial data to the navigational computer. Aircraft maneuvers (i.e., acceleration, changes in pitch, roll and yaw, takeoff and landing), turbulence and engine operation all generate shock and vibrational energy that is conveyed through the aircraft frame to the support for the ISA. This shock and vibrational energy may manifest itself as linear or angular acceleration errors in the inertial data provided by the sensors to the navigational computer. Hence, the need for the shock and vibration isolation of the ISA provided by a vibration isolator.

One such known vibration isolator system 10 for an ISA 12 is illustrated in FIGS. 1 and 2. The ISA 12 includes inertial sensors 14 mounted within a housing 16 defined by a base member 18 and a cover member 20 which are sealed together by a seal ring 22 in a manner known in the art. The inertial sensors 14 are defined by three accelerometers and three ring laser gyroscopes and their associated electronics and hardware as is generally known in the art. An electrical connector 24 mounted in the cover member 20 allows inertial data to be transmitted between the inertial sensors 14 and a navigational computer (not shown) onboard an aircraft.

The base member 18 of the housing 16 includes three mounting lugs 26 (only two of which can be seen in FIG. 1) equally spaced about the circumference of the base member 18. Each mounting lug 26 includes an aperture 28 adapted to receive a threaded fastener 30. The fasteners 30 engage cooperating, threaded openings 32 of inertia ring 34 to rigidly secure the ISA 12 to the inertia ring 34.

As seen best in FIG. 1, the vibration isolator system 10 includes three isolator mounts 36. Each isolator mount 36 includes an outer frame 38 adapted to hold an elastomeric element 40 that provides the isolator mount 36 with its shock and vibration isolation functionality. The elastomeric element 40 is a donut-shaped member which is injection molded onto the outer frame 38 and an inner aperture element 42 simultaneously, using standard injection molding processes generally known in the art. The elastomeric material is a phenyl-methyl vinyl silicone of the form 2FC303A19B37E016F1-11G11 as specified in the American Society for Testing and Materials (ASTM) document ASTM-D2000. Silicone materials of this type are fabricated by numerous manufacturers for a variety of associated applications. The inner aperture element 42 of each elastomeric element 40 is adapted to receive a threaded fastener 44. Each threaded fastener 44 engages a cooperating threaded hole 46 in the inertia ring 34 to secure the elastomeric element 40 of the respective isolator mount 36 to the inertia ring 34 secured to the ISA 12. As seen best in FIG. 1, the isolator mounts 36 are equally spaced about the inertia ring 34. As seen best in FIG. 2, the outer frames 38 of the isolator mounts 36 are secured to a support 48 (shown in dashed lines, and only partially shown relative to one of the isolator mounts 36 for clarity) via threaded fasteners 50. The fasteners 50 pass through apertures 52 of the support 48 to engage threaded openings 54 of the outer frames 38 of the isolator mounts 36.

Though the isolator mounts 36 of the vibration isolator system 10 adequately isolate the ISA 12 from shock and vibration energy conveyed through the support 48, there are some difficulties encountered with the use of multiple discrete isolator mounts. For example, when using multiple discrete isolator mounts it is necessary to match the isolator natural frequencies of the isolator mounts to be used on a selected ISA. In other words, because natural frequency matching is commonly required at the ISA integration level, each individual isolator mount must be tested, segregated, and marked according to its specific natural frequency and amplification factor. The segregated isolator mounts are then packaged as matched sets for installation to a selected ISA. If one isolator mount of the matched set is damaged or lost during the assembly process, the entire matched set must be scraped since unmatched mounts may allow uncompensatable motion of the ISA which will result in inertial data errors.

Another difficulty encountered with the use of multiple discrete isolator mounts results because the discrete mounts are attached at various locations about the ISA. Care must be taken to accurately mount and align the center of gravity (CG) of the ISA on the elastic centers of the isolator mounts. Otherwise CG and elastic center offsets may result in uncompensated rocking and coning motions in the ISA which will manifest themselves in inertial data errors. Therefore, multiple discrete isolator mount systems are difficult to manufacture and hence expensive.

There is a need for improved vibration isolator systems for ISA's. In particular, there is a need for a vibration isolator system that eliminates the need to match the natural frequencies of multiple isolator mounts while providing acceptable shock and vibration isolation of the ISA. In addition, it should be relatively easy to align the elastic center of the vibration isolator system with the CG of the ISA. Lastly, the vibration isolator system should be relatively easy and inexpensive to manufacture.

SUMMARY OF THE INVENTION

The present invention is a vibration isolator system for mounting an inertial sensor assembly (ISA) to a support that is subject to shock and vibration. The vibration isolator system includes a ring shaped elastomeric member, a rigid ring shaped outer member and a rigid ring shaped inner member. The outer member encircles the elastomeric member and is fixed thereto. In addition, the outer member is secured to the support. The inner member is encircled by the elastomeric member and is fixed to the elastomeric member. Moreover, the inner member is secured to the ISA such that the elastomeric member isolates the ISA from shock and vibration that may otherwise be transmitted from the support to the ISA. The vibration isolator system eliminates the need to match the natural frequencies of multiple isolator mounts since only a single elastomeric member is used. In addition, since there is only a single elastomeric member, it is relatively easy to align the elastic center of the elastomeric member with the center of gravity (CG) of the ISA. The vibration isolator system provides improved shock and vibration isolation of the ISA and is relatively easy and inexpensive to manufacture.

DETAILED DESCRIPTION OF THE PREFERRED EMBODIMENTS

Figure 1:
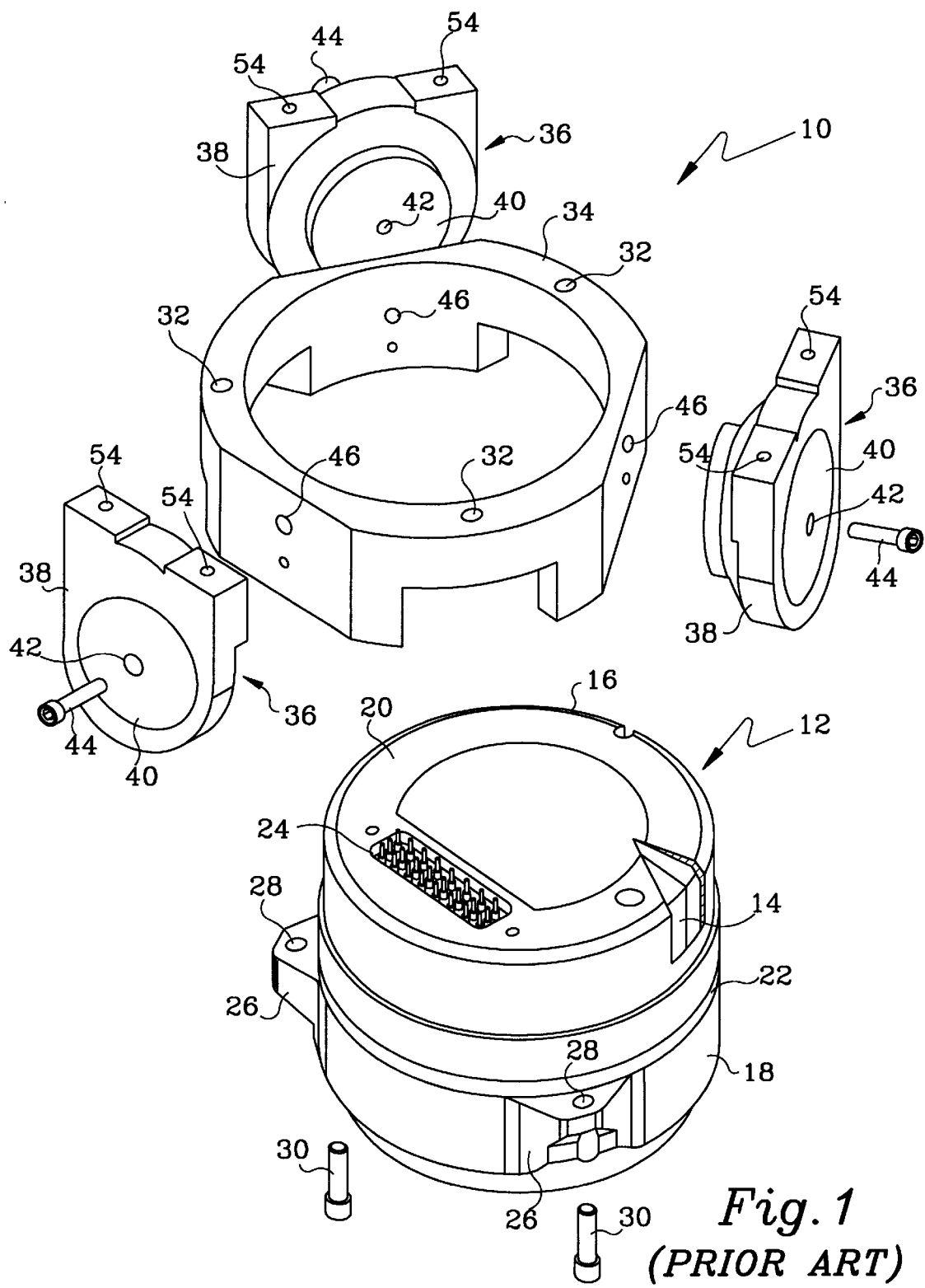
FIG. 1 is an exploded perspective view of a vibration isolator system for an inertial sensor assembly known to those skilled in the art.
Figure 2:
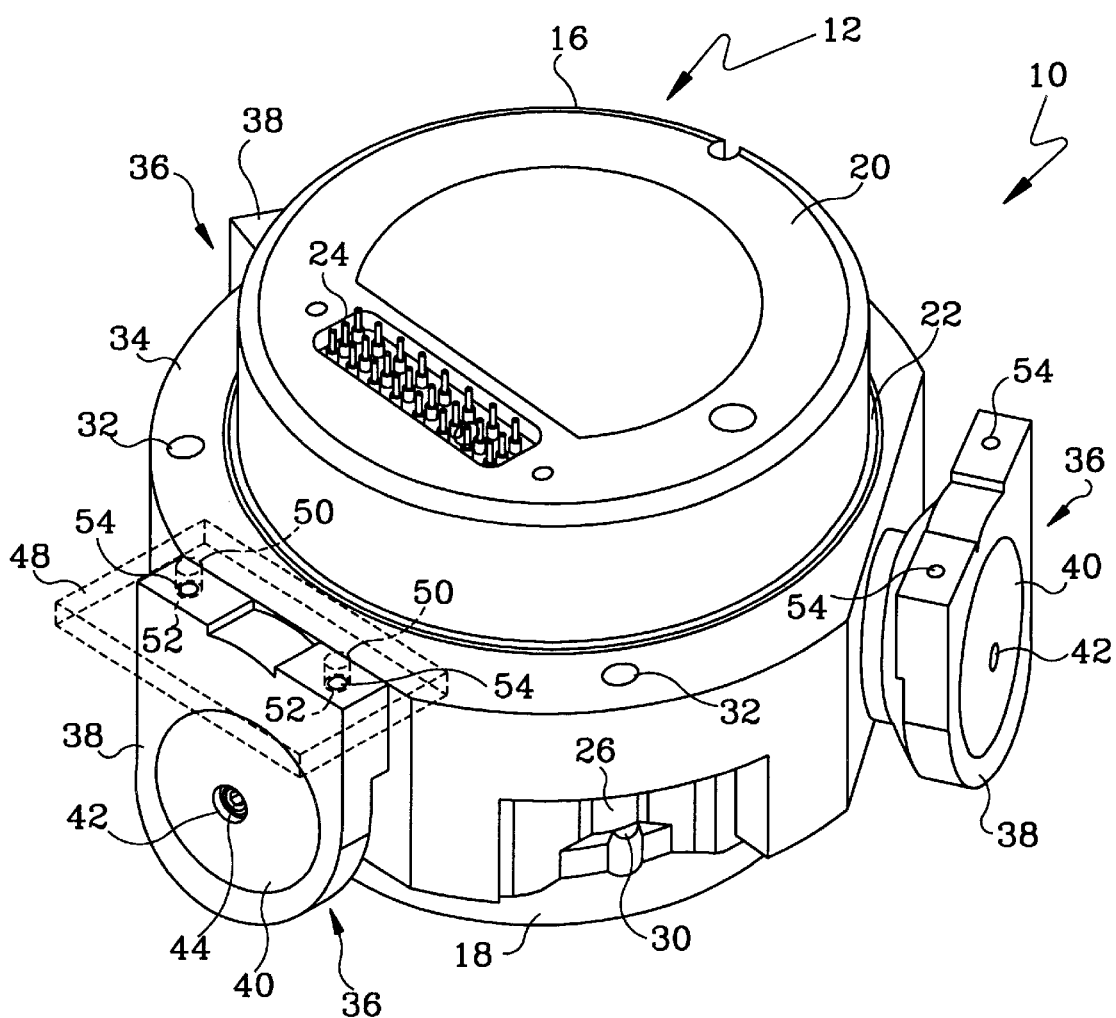
FIG. 2 is an assembled perspective view of the known vibration isolator system shown in FIG. 1.
Figure 3:
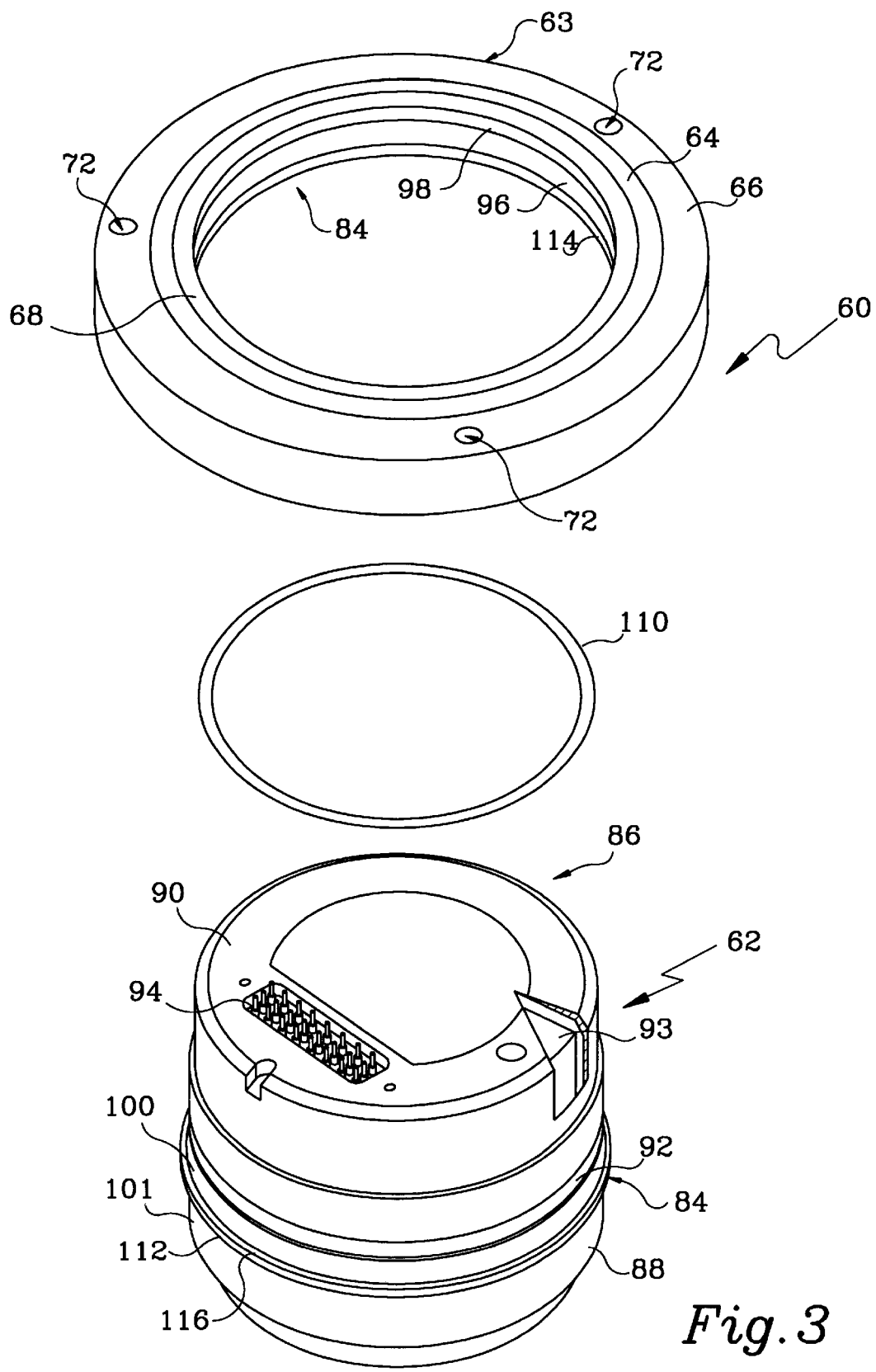
FIG. 3 is an exploded perspective view of a vibration isolator system for an inertial sensor assembly in accordance with the present invention.
Figure 4:
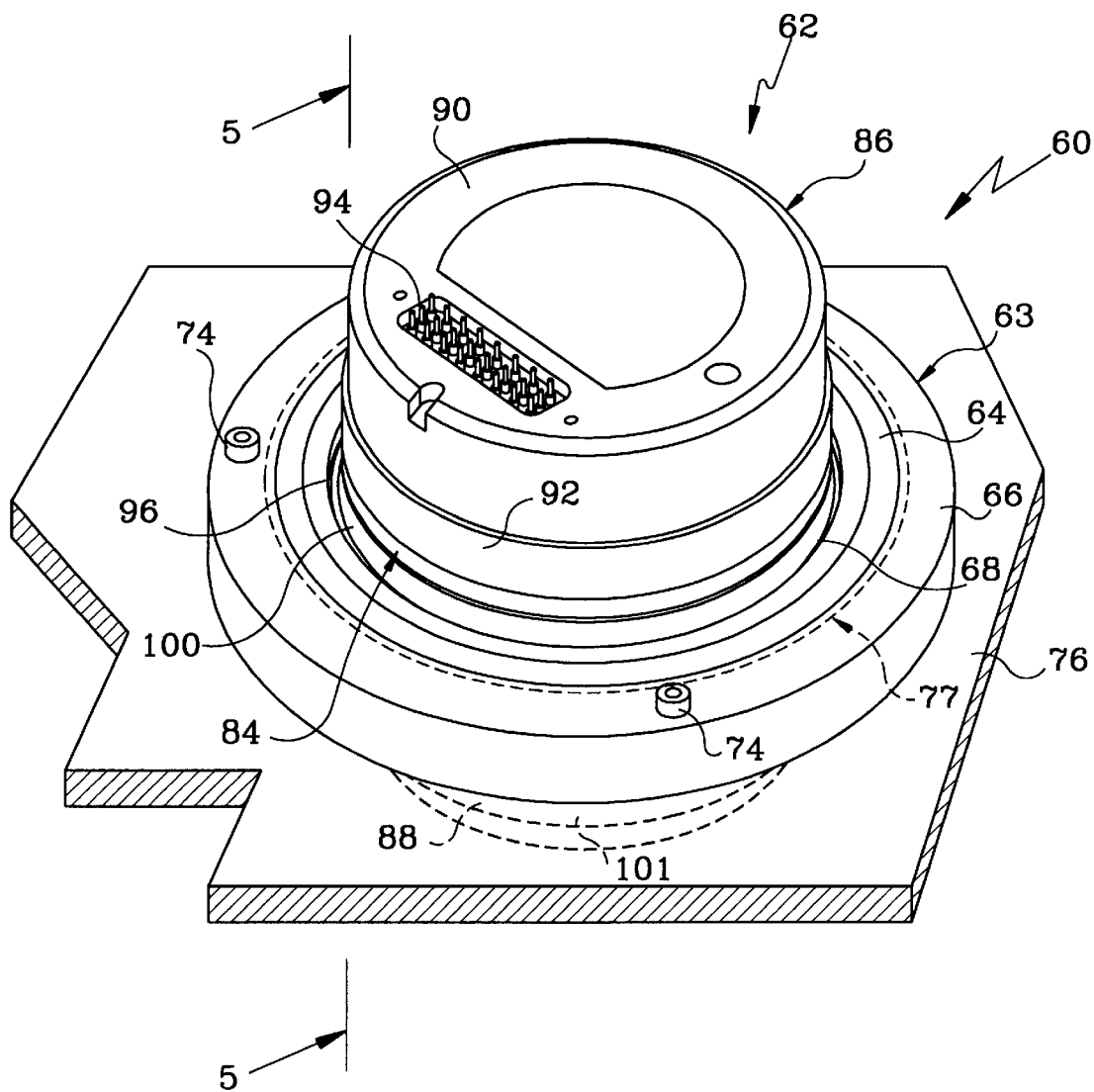
FIG. 4 is an assembled perspective view of the vibration isolator system shown in FIG. 3.
Figure 5:
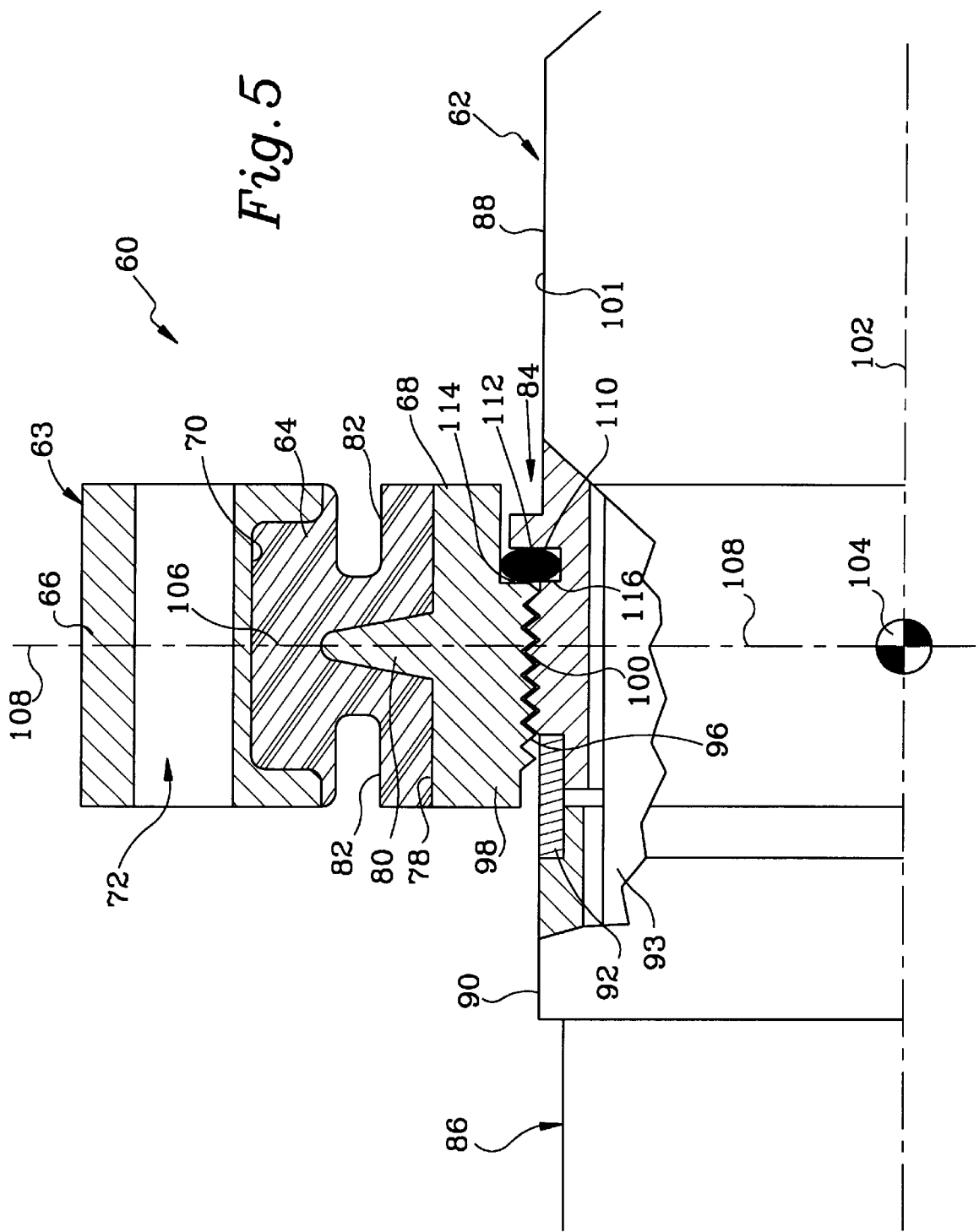
FIG. 5 is a partial sectional view of the vibration isolator system taken along line 5—5 in FIG. 4 with a threaded fastener and support removed for clarity.

A vibration isolator system 60 for an inertial sensor assembly (ISA) 62 in accordance with the present invention is illustrated generally in FIGS. 3–5. As seen in FIGS. 3 and 5, the vibration isolator system 60 includes an isolator mount 63 defined by a ring shaped elastomeric member 64, a rigid ring shaped outer member 66 and a rigid ring shaped inner member 68. The outer member 66 encircles and is concentric with the elastomeric member 64. As seen best in FIG. 5, an inner side wall 70 of the outer member 66 is channel shaped to provide adequate surface area to fix the elastomeric member 64 to the outer member 66. The outer member 66 also includes three apertures 72 equally spaced (i.e., 120° apart) about the periphery of the outer member 66. As seen in FIG. 4, the apertures 72 are adapted to receive a threaded fastener 74 (only two of which can be seen in FIG. 4). The threaded fasteners 74 engage threaded holes (not seen) in a support 76 that is subject to shock and vibration. The support 76 has an opening 77 adapted to freely receive the ISA 62 therethrough. The support 76 is part of a vehicle. In one preferred embodiment, the support 76 is a chassis attached to the frame of an aircraft.

As seen in FIGS. 3 and 5, the inner member 68 is encircled by and is concentric with the elastomeric member 64. As seen best in FIG. 5, an outer side wall 78 of the inner member 68 includes a radially extending ridge portion 80 that increases the surface area of the outer side wall 78 available to fix the elastomeric member 64 to the inner member 68. The elastomeric member 64 includes cutout regions 82 that are concentric with the outer and inner members 66 and 68, respectively. The cutout regions 82 give the elastomeric member 64 some flexibility that aids in damping and absorbing unwanted shock and vibration energy transmitted by the support 76.

In one preferred embodiment, the elastomeric element 64 is manufactured of a phenyl-methyl vinyl silicone rubber of the form 2FC303A19B37E016F1-11G11 as specified in the American Society for Testing and Materials (ASTM) document ASTM-D2000. Silicone materials of this type are fabricated by numerous manufacturers for a variety of associated applications. The outer and inner members 66 and 68, respectively, are manufactured of an aluminum alloy. In the one preferred embodiment, the silicone rubber elastomeric material is injection molded under high temperature and pressure into a cavity between the outer and inner members 66 and 68, respectively. The silicone rubber material bonds to the metal surfaces of the outer and inner rings 66 and 68, respectively, and holds the vibration isolator system 60 together. The silicone rubber material provides the vibration isolator system 60 with its primary isolator/damping functionality.

As seen in FIGS. 3–5, a coupling apparatus 84 attaches the inner ring 68 of the vibration isolator system 60 to a housing 86 of the ISA 62. The housing 86 is defined by a base member 88 and a cover member 90 which are sealed together by a seal ring 92 in a manner known in the art. The housing 86 contains and protects inertial sensors 93 of the ISA 62. In one preferred embodiment, the inertial sensors 93 are defined by three accelerometers and three ring laser gyroscopes and their associated electronics and hardware as is generally known in the art. An electrical connector 94 mounted in the cover member 90 allows inertial data to be transmitted between the inertial sensors 93 and a navigational computer (not shown) onboard the aircraft.

As seen best in FIG. 5, the coupling apparatus 84 includes an adjustment mechanism defined by a threaded region 96 on an inner side wall 98 of the inner member 68. The threaded region 96 mates with a cooperating threaded portion 100 on an outer side wall 101 of the base member 88 of the housing 86. Threaded interengagement of the threaded region 96 with the threaded portion 100 attaches the ISA 62 to the vibration isolator system 60 and permits limited linear movement of the housing 86 of the ISA 62 along a longitudinal axis 102 of the ISA 62 that is perpendicular to a plane defined by the elastomeric member 64. The limited linear movement permitted by the threaded interengagement referred above allows alignment of a lateral center of gravity 104 of the ISA 62 (i.e., housing 86) with an elastic center 106 of the elastomeric member 64 of the vibration isolator system 60. As seen best in FIG. 5, the lateral center of gravity 104 lies along a lateral axis 108 of the ISA 62 that is perpendicular to the longitudinal axis 102.

As seen in FIGS. 3 and 5, the coupling apparatus 84 further includes a stop mechanism defined by a resilient member 110 that acts between a ledge section 112 on the outer side wall 101 of the base member 88 of the housing 86 and a ledge region 114 on the inner side wall 98 of the inner member 68. The resilient member 110 is retained within a channel 116 on the outer side wall 101 of the base member 88. The resilient member 110 provides a spring force that acts between the housing 86 and the inner member 68 upon compression of the resilient member between ledge section 112 and ledge region 114 as the ISA 62 is screwed onto the vibration isolator system 60. The spring force maintains the position of the ISA 62 relative to the vibration isolator system 60, and thereby maintains the alignment of the lateral center of gravity 104 of the ISA 62 with the elastic center 106 of the vibration isolator system 60. In one preferred embodiment, the resilient member 110 is an O-ring made of material of the form 8GE409A19B37EA14G11E016E036F19 as specified in the American Society for Testing and Materials (ASTM) document ASTM-D2000. Materials of this type are fabricated by numerous manufacturers for a variety of associated applications.

The vibration isolator system 60 isolates the ISA 62 from shock and vibration that may otherwise be transmitted from the support 76 to the ISA 62. The vibration isolator system 60 eliminates the need to match the natural frequencies of multiple isolator mounts since only a single elastomeric member 64 is used. In addition, since there is only a single elastomeric member 64, it is relatively easy to align the elastic center 106 of the elastomeric member 64 with the center of gravity (CG) 104 of the ISA 62. The vibration isolator system 60 provides acceptable shock and vibration isolation of the ISA 62 and is relatively easy and inexpensive to manufacture.

Although the present invention has been described with reference to preferred embodiments, workers skilled in the art will recognize that changes may be made in form and detail without departing from the spirit and scope of the invention.

I claim:

1. A vibration isolator system for mounting an inertial sensor assembly to a support that is subject to shock and vibration, comprising:
   a ring shaped elastomeric member;
   a rigid, ring shaped outer member encircling the elastomeric member and being fixed thereto, the outer member adapted to be secured to a support; and
   a rigid, ring shaped inner member encircled by the elastomeric member and being fixed thereto, the inner member adapted to be secured to an inertial sensor assembly, such that the elastomeric member isolates an inertial sensor assembly from shock and vibration that may otherwise be transmitted from a support to an inertial sensor assembly.

2. The vibration isolator system of claim 1, further including:
   a coupling apparatus for attaching the inner ring of the vibration isolator system to an inertial sensor assembly so that an elastic center of the elastomeric member is aligned with a center of gravity of an inertial sensor assembly.

3. The vibration isolator system of claim 2 wherein the coupling apparatus includes:
   an adjustment mechanism for permitting relative movement between the elastomeric member and an inertial sensor assembly so that the center of gravity of an inertial sensor assembly can be aligned with the elastic center of the elastomeric member after an inertial sensor assembly is attached to the inner ring.

4. The vibration isolator system of claim 3 wherein the adjustment mechanism includes a threaded region on the inner ring that mates with a cooperating threaded portion of an inertial sensor assembly to attach a sensor assembly to the inner ring, and permit linear movement of a sensor assembly along a longitudinal axis of a sensor assembly that is perpendicular to a plane defined by the elastomeric member, for aligning the elastic center with a center of gravity of the sensor assembly.

5. The vibration isolator system of claim 4 wherein the coupling apparatus further includes:
   a stop mechanism for maintaining the position of an inertial sensor assembly on the inner ring once the alignment of the elastic center with a center of gravity of a sensor assembly is achieved.

6. The vibration isolator system of claim 5 wherein the stop mechanism includes a resilient member that provides a spring force that acts between the inner ring and an inertial sensor assembly to maintain the position of a sensor assembly with a center of gravity thereof aligned with the elastic center of the elastomeric member.

7. The vibration isolator system of claim 6 wherein the resilient member is an O-ring.

8. The vibration isolator system of claim 1 wherein the elastomeric member is manufactured of a silicone rubber elastomeric material.

9. A mounting apparatus for securing a housing for an inertial sensor assembly to a support that is subject to shock and vibration, comprising:
   a housing for an inertial sensor assembly, the housing having a longitudinal axis and a lateral axis perpendicular to the longitudinal axis, a lateral center of gravity of the housing lying along the lateral axis;
   a vibration isolator system connected to the support and having a center of elasticity, the vibration isolator system acting to isolate the housing for an inertial sensor assembly from shock and vibration that may otherwise be transmitted from a support to the housing; and
   a coupling apparatus for attaching the vibration isolator system to the housing, the coupling apparatus including:
      an adjustment mechanism for permitting relative movement between the vibration isolator system and the housing so that the lateral center of gravity of the housing can be aligned with the elastic center of the vibration isolator system.

10. The mounting apparatus of claim 9 wherein the adjustment mechanism includes a threaded region on the vibration isolator system that mates with a cooperating threaded portion on the housing to attach the housing to the vibration isolator system, and permit linear movement of the housing along the longitudinal axis for aligning the lateral center of gravity with the elastic center.

11. The mounting apparatus of claim 10 wherein the coupling apparatus further includes:
   a stop mechanism for maintaining the position of the housing relative to the vibration isolator system once the alignment of the elastic center with the lateral center of gravity has been achieved.

12. The mounting apparatus of claim 11 wherein the stop mechanism includes a resilient member that provides a spring force, upon compression of the resilient member, that acts between a ledge section on the housing and a ledge region on the vibration isolator system to maintain the position of the housing relative to the vibration isolator system and maintain the alignment of the lateral center of gravity with the elastic center.

13. The mounting apparatus of claim 12 wherein the resilient member is an O-ring.

14. The mounting apparatus of claim 9 wherein the vibration isolator system includes:

an elastomeric member, the elastomeric member defining the elastic center of the vibration isolator system;

a first member fixed to the elastomeric member and adapted to be secured to a support; and a second member fixed to the elastomeric member, the second member including the coupling apparatus.

15. The mounting apparatus of claim 14 wherein each of the elastomeric, first and second members is ring shaped, and wherein the first and second members are concentric with the elastomeric member.

16. The mounting apparatus of claim 15 wherein the first member is fixed to an outer side of the elastomeric member, and wherein the second member is fixed to an inner side of the elastomeric member.

17. The mounting apparatus of claim 16 wherein the elastomeric member is manufactured of a silicone rubber elastomeric material.

* * * * *